United States Patent
Zhao et al.

(10) Patent No.: US 10,912,052 B2
(45) Date of Patent: Feb. 2, 2021

(54) METHOD FOR TRANSMITTING SYNCHRONIZATION SEQUENCE, AND METHOD AND DEVICE FOR SYNCHRONIZATION DETECTION

(71) Applicant: CHINA ACADEMY OF TELECOMMUNICATIONS TECHNOLOGY, Beijing (CN)

(72) Inventors: Zheng Zhao, Beijing (CN); Bin Ren, Beijing (CN); Fangchen Cheng, Beijing (CN); Wenping Ma, Beijing (CN); Shaohui Sun, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/476,686

(22) PCT Filed: Feb. 6, 2018

(86) PCT No.: PCT/CN2018/075481
§ 371 (c)(1),
(2) Date: Jul. 9, 2019

(87) PCT Pub. No.: WO2018/127222
PCT Pub. Date: Jul. 12, 2018

(65) Prior Publication Data
US 2019/0327698 A1    Oct. 24, 2019

(30) Foreign Application Priority Data

Jan. 9, 2017  (CN) .......................... 2017 1 0013632
Feb. 6, 2017  (CN) .......................... 2017 1 0107142

(51) Int. Cl.
*H04W 4/00*   (2018.01)
*H04W 56/00*  (2009.01)
(Continued)

(52) U.S. Cl.
CPC ..... *H04W 56/0015* (2013.01); *H04J 13/0062* (2013.01); *H04L 1/1642* (2013.01); *H04L 5/0094* (2013.01)

(58) Field of Classification Search
None
See application file for complete search history.

(56) References Cited

U.S. PATENT DOCUMENTS

| 7,965,797 B2 | 6/2011 | Kwasinski et al. |
| 2009/0086713 A1 | 4/2009 | Luo |

(Continued)

FOREIGN PATENT DOCUMENTS

| CN | 101374129 A | 2/2009 |
| CN | 101465830 A | 6/2009 |

(Continued)

OTHER PUBLICATIONS

First Office Action and search report from CN app. No. 201710107142.1, dated Sep. 26, 2019, with English translation from Global Dossier.

(Continued)

*Primary Examiner* — Phirin Sam
(74) *Attorney, Agent, or Firm* — Ladas & Parry, LLP

(57) ABSTRACT

A method for transmitting a synchronization sequence, and a method and a device for synchronization detection are provided, the method for transmitting the synchronization sequence including: setting a target synchronization sequence with good autocorrelation characteristic, where at least one segment of sequence truncated in a time domain or a frequency domain of the target synchronization sequence (Continued)

```
setting a target synchronization sequence with good
autocorrelation characteristic, where at least one segment of
sequence truncated in a time domain or a frequency domain of   — 11
the target synchronization sequence is a sub-synchronization
sequence, the sub-synchronization sequence has good
autocorrelation characteristic and the sub-synchronization
sequences have good cross-correlation between each other
```

```
transmitting the target synchronization sequence to a user    — 12
equipment
``` is a sub-synchronization sequence, and the sub-synchronization sequence has good autocorrelation characteristic and the sub-synchronization sequences have good cross-correlation between each other; and transmitting the target synchronization sequence to a user equipment.

20 Claims, 2 Drawing Sheets

(51) Int. Cl.
*H04J 13/00* (2011.01)
*H04L 1/16* (2006.01)
*H04L 5/00* (2006.01)

(56) References Cited

U.S. PATENT DOCUMENTS

| | | | |
|---|---|---|---|
| 2012/0045011 A1 | 2/2012 | Lee et al. | |
| 2012/0281629 A1 | 11/2012 | Zhou et al. | |
| 2013/0196652 A1* | 8/2013 | Kim | H04W 28/0215 |
| | | | 455/426.1 |
| 2015/0229490 A1* | 8/2015 | Brandstatter | H04L 69/164 |
| | | | 370/469 |
| 2015/0264588 A1* | 9/2015 | Li | H04W 56/0015 |
| | | | 370/350 |
| 2015/0318957 A1* | 11/2015 | Adachi | H04W 88/02 |
| | | | 370/310 |
| 2016/0112973 A1 | 4/2016 | Wang et al. | |
| 2016/0128009 A1* | 5/2016 | Yoon | H04W 4/70 |
| | | | 370/350 |
| 2016/0134416 A1* | 5/2016 | Kawata | H04L 1/0071 |
| | | | 370/479 |
| 2016/0270012 A1 | 9/2016 | Chen et al. | |
| 2017/0005851 A1 | 1/2017 | Wu et al. | |
| 2017/0099220 A1* | 4/2017 | Adachi | H04B 1/44 |
| 2017/0164308 A1 | 6/2017 | Ji et al. | |
| 2018/0241529 A1* | 8/2018 | Zhang | H04W 4/70 |
| 2018/0248735 A1 | 8/2018 | Zhang et al. | |
| 2019/0280796 A1* | 9/2019 | Wei | H04W 48/16 |

FOREIGN PATENT DOCUMENTS

| | | |
|---|---|---|
| CN | 101547043 A | 9/2009 |
| CN | 102255722 A | 11/2011 |
| CN | 103763297 A | 4/2014 |
| CN | 103944665 A | 7/2014 |
| CN | 105049394 A | 11/2015 |
| CN | 105264784 A | 1/2016 |
| CN | 105519212 A | 4/2016 |
| CN | 103475616 B | 3/2017 |
| CN | 106559206 A | 4/2017 |
| TW | 200913594 A | 3/2009 |
| TW | 201521485 A | 6/2015 |
| WO | 2011095010 A1 | 8/2011 |

OTHER PUBLICATIONS

First Office Action from TW app. No. 107104651, dated Mar. 28, 2019, with machine English translation.
Written Opinion of the International Searching Authority and International Search Report from PCT/CN2018/075481, dated Apr. 26, 2018, with English translation from WIPO.
International Preliminary Report on Patentability from PCT/CN2018/075481, dated Jul. 9, 2019, with English translation from WIPO.

* cited by examiner

METHOD FOR TRANSMITTING SYNCHRONIZATION SEQUENCE, AND METHOD AND DEVICE FOR SYNCHRONIZATION DETECTION

CROSS-REFERENCE TO RELATED APPLICATIONS

This application is the U.S. national phase of PCT Application No. PCT/CN2018/075481 filed on Feb. 6, 2018, which claims a priority to Chinese Patent Application No. 201710013632.5 filed on Jan. 9, 2017 and a priority to Chinese Patent Application No. 201710107142.1 filed on Feb. 6, 2017, the disclosures of which are incorporated in their entirety entireties by reference herein.

TECHNICAL FIELD

The present disclosure relates to the field of communication technology, in particular to a method for transmitting a synchronization sequence, and a method and a device for synchronization detection.

BACKGROUND

In a 5G system, a synchronization sequence has a long period to support a multi-beam system. In order to reduce the latency in synchronization detection, accuracy of single detection needs to be improved as much as possible for synchronization detection; to this end, the synchronization sequence needs to be as long as possible, and as far as the frequency domain is concerned, the bandwidth of the synchronization sequence needs to be as wide as possible. In 5G communication, system bandwidth for users may range from 180 k to 80M and different users may have different operation bandwidths in the same frequency band. To ensure performance of a one-time detection and to support users with different bandwidths, it is required that the synchronization sequence can be applied for different band widths, that is, having been truncated in the frequency domain, the synchronization sequence still has good autocorrelation and cross-correlation characteristics.

Additionally, when a user is in quick movement, the synchronization signal needs to have a large carrier spacing to ensure synchronization detection accuracy. However, with an overall bandwidth being unchanged, a large carrier spacing would lead to a reduction in the length of synchronization sequence. Thus, the synchronization sequence needs to be designed to support different carrier spacings.

For a synchronization sequence in a conventional Long Term Evolution (LTE) system, using the synchronization sequence truncated in bandwidth as a synchronization sequence is not supported, and the synchronization sequence does not support different carrier spacings.

SUMMARY

The present disclosure is to provide a method for transmitting a synchronization sequence, and a method and a device for synchronization detection, to solve the problem that a sequence length and a bandwidth of a synchronization sequence in the related technologies put constraints on each other which leads to low detection accuracy.

To meet the above objective, an embodiment of the present disclosure provides a method for transmitting a synchronization sequence, comprising:

setting a target synchronization sequence, wherein at least one segment of sequence truncated in a time domain or a frequency domain of the target synchronization sequence is a synchronization sequence; and transmitting the target synchronization sequence to a user equipment.

Optionally, setting the target synchronization sequence comprises:

obtaining a reference synchronization sequence; and rearranging, in accordance with a preset rule, a plurality of sequence points of the reference synchronization sequence, to obtain the target synchronization sequence.

Optionally, in a case that the reference synchronization sequence is a Zadoff-Chu (ZC) sequence and a length of the ZC sequence is even, rearranging, in accordance with the preset rule, the plurality of sequence points of the reference synchronization sequence, to obtain the target synchronization sequence comprises:

extracting the sequence points from the reference synchronization sequence at equal intervals and placing the extracted sequence points sequentially to obtain the target synchronization sequence.

Optionally, extracting the sequence points from the reference synchronization sequence at equal intervals and placing the extracted sequence points sequentially to obtain the target synchronization sequence comprises:

extracting even-numbered sequence points and odd-numbered sequence points from the reference synchronization sequence;

partitioning the even-numbered sequence points into a plurality of first short sequences, and partitioning the odd-numbered sequence points into a plurality of second short sequences, wherein the first short sequence comprises a plurality of successive even-numbered sequence points and the second short sequence comprises a plurality of successive odd-numbered sequence points; and arranging, in accordance with a preset order, the plurality of first short sequences and the plurality of second short sequences, to obtain the target synchronization sequence.

Optionally, arranging, in accordance with the preset order, the plurality of first short sequences and the plurality of second short sequences, to obtain the target synchronization sequence comprises:

placing the first short sequences and the second short sequences alternately, to obtain the target synchronization sequence.

Optionally, in a case that a result of dividing a length of the reference synchronization sequence by 4 is even, the plurality of first short sequences are ZC sequences; and in a case that the result of dividing the length of the reference synchronization sequence by 4 is odd, the plurality of second short sequences are ZC sequences.

Optionally, in a case that the reference synchronization sequence is a ZC sequence, and a length of the ZC sequence is odd and equal to a square of N, rearranging, in accordance with the preset rule, the plurality of sequence points of the reference synchronization sequence, to obtain the target synchronization sequence comprises:

extracting a target sequence point, starting from a $0^{th}$ sequence point of the reference synchronization sequence, from every N successive sequence points of the reference synchronization sequence; and placing the extracted target sequence points sequentially in preset positions of the reference synchronization sequence, to obtain the target synchronization sequence, wherein N is an integer greater than or equal to 3.

Optionally, the preset positions are those with sequence numbers starting from integer multiples of N.

Optionally, in a case that the length of the ZC sequence is an integer multiple of X, the synchronization sequence truncated in the time domain of the target synchronization sequence is a sequence which is a one-$X^{th}$ sequence segment of the target synchronization sequence, and the synchronization sequence is a ZC sequence, wherein X is an integer greater than or equal to 2.

Optionally, in a case that the reference synchronization sequence is a ZC sequence and a length of the ZC sequence is even, rearranging, in accordance with the preset rule, the plurality of sequence points of the reference synchronization sequence, to obtain the target synchronization sequence comprises:

truncating even-numbered sequence points and odd-numbered sequence points of the reference synchronization sequence;

placing the even-numbered sequence points of the reference synchronization sequence before the odd-numbered sequence points of the reference synchronization sequence to obtain a rearranged sequence; or placing the odd-numbered sequence points of the reference synchronization sequence before the even-numbered sequence points of the reference synchronization sequence to obtain the rearranged sequence; and mapping the rearranged sequence to subcarriers in the frequency domain respectively and performing an inverse Fourier transformation on the mapped rearranged sequence to obtain the target synchronization sequence.

Optionally, the synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the synchronization sequence is a ZC sequence.

Another embodiment of the present disclosure provides a method for synchronization detection, comprising:

receiving a target synchronization sequence transmitted by a base station; and performing synchronization detection on the basis of the target synchronization sequence.

Optionally, performing the synchronization detection on the basis of the target synchronization sequence comprises:

truncating a segment of sequence in a time domain or a frequency domain of the target synchronization sequence as a synchronization sequence; and performing the synchronization detection on the basis of the truncated synchronization sequence.

Optionally, in a case that the target synchronization sequence is a ZC sequence and a length of the ZC sequence is even, the synchronization sequence truncated in the time domain or the frequency domain of the target synchronization sequence is one or more first short sequences and/or one or more second short sequences within the target synchronization sequence, wherein the first short sequence comprises a plurality of sequence points and the second short sequence comprises a plurality of sequence points.

Optionally, performing the synchronization detection on the basis of the target synchronization sequence comprises:

performing a correlation processing on the target synchronization sequence with a preset synchronization sequence;

determining a subcarrier spacing with which the base station transmits the target synchronization sequence, on the basis of the quantity of correlated peaks derived from the correlation processing; and performing the synchronization detection on the basis of the subcarrier spacing and the truncated synchronization sequence.

Optionally, in a case that the target synchronization sequence is a ZC sequence and a length of the ZC sequence is odd and equal to a square of N, the synchronization sequence truncated in the time domain of the target synchronization sequence is a sequence which is a one-$X^{th}$ sequence segment of the target synchronization sequence, and the truncated synchronization sequence is a ZC sequence, wherein a length of the ZC sequence is an integer multiple of X, and X is an integer greater than or equal to 2.

Optionally, performing the synchronization detection on the basis of the truncated synchronization sequence comprises:

calculating a $p^{th}$ power of the truncated synchronization sequence to obtain a to-be-detected sequence, wherein p is an integer greater than or equal to 2; and performing the synchronization detection on the basis of the to-be-detected sequence.

Another embodiment of the present disclosure provides a device for transmitting a synchronization sequence, comprising:

a sequence setting module, configured to set a target synchronization sequence, wherein at least one segment of sequence truncated in a time domain or a frequency domain of the target synchronization sequence is a synchronization sequence; and a sequence transmitting module, configured to transmit the target synchronization sequence to a user equipment.

Optionally, the sequence setting module comprises:

a reference obtaining module, configured to obtain a reference synchronization sequence; and a rearranging module, configured to rearranging, in accordance with a preset rule, a plurality of sequence points of the reference synchronization sequence, to obtain the target synchronization sequence.

Optionally, the rearranging module comprises:

a first rearranging submodule, configured to extract, in a case that the reference synchronization sequence is a ZC sequence and a length of the ZC sequence is even, the sequence points from the reference synchronization sequence at equal intervals and place the extracted sequence points sequentially to obtain the target synchronization sequence.

Optionally, the first rearranging submodule comprises:

a first extracting unit, configured to extract even-numbered sequence points and odd-numbered sequence points from the reference synchronization sequence;

a first partitioning unit, configured to partition the even-numbered sequence points into a plurality of first short sequences, and partitioning the odd-numbered sequence points into a plurality of second short sequences, wherein the first short sequence comprises a plurality of successive even-numbered sequence points and the second short sequence comprises a plurality of successive odd-numbered sequence points; and a rearranging unit, configured to arrange, in accordance with a preset order, the plurality of first short sequences and the plurality of second short sequences, to obtain the target synchronization sequence.

Optionally, the rearranging unit comprises:

a rearranging subunit, configured to place the first short sequences and the second short sequences alternately, to obtain the target synchronization sequence.

Optionally, in a case that a result of dividing a length of the reference synchronization sequence by 4 is even, the plurality of first short sequences are ZC sequences; and in a case that the result of dividing the length of the reference synchronization sequence by 4 is odd, the plurality of second short sequences are ZC sequences.

Optionally, the rearranging module comprises:

an extracting submodule, configured to extract, in a case that the reference synchronization sequence is a ZC sequence, and a length of the ZC sequence is odd and equal to a square of N, a target sequence point, starting from a $0^{th}$ sequence point of the reference synchronization sequence, from every N successive sequence points of the reference synchronization sequence; and a second rearranging submodule, configured to place the extracted target sequence points sequentially in preset positions of the reference synchronization sequence, to obtain the target synchronization sequence, wherein N is an integer greater than or equal to 3.

Optionally, the preset positions are those with sequence numbers starting from integer multiples of N.

Optionally, in a case that the length of the ZC sequence is an integer multiple of X, the synchronization sequence truncated in the time domain of the target synchronization sequence is a sequence which is a one-$X^{th}$ sequence segment of the target synchronization sequence, and the synchronization sequence is a ZC sequence, wherein X is an integer greater than or equal to 2.

Optionally, the rearranging module comprises:

a second truncating submodule, configured to truncate, in a case that the reference synchronization sequence is a ZC sequence and a length of the ZC sequence is even, even-numbered sequence points and odd-numbered sequence points of the reference synchronization sequence;

a third rearranging submodule, configured to place the even-numbered sequence points of the reference synchronization sequence before the odd-numbered sequence points of the reference synchronization sequence to obtain a rearranged sequence; or place the odd-numbered sequence points of the reference synchronization sequence before the even-numbered sequence points of the reference synchronization sequence to obtain the rearranged sequence; and a frequency-domain-mapping submodule, configured to map the rearranged sequence to subcarriers in the frequency domain respectively and perform an inverse Fourier transformation on the mapped rearranged sequence to obtain the target synchronization sequence.

Optionally, the synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the truncated synchronization sequence is a ZC sequence.

Another embodiment of the present disclosure provides a device for synchronization detection, comprising:

a sequence receiving module, configured to receive a target synchronization sequence transmitted by a base station; and a detection module, configured to perform synchronization detection on the basis of the target synchronization sequence.

Optionally, the detection module comprises:

a truncating submodule, configured to truncate a segment of sequence in a time domain or a frequency domain of the target synchronization sequence as a synchronization sequence; and a detection submodule, configured to perform the synchronization detection on the basis of the truncated synchronization sequence.

Optionally, in a case that the target synchronization sequence is a ZC sequence and a length of the ZC sequence is even, the synchronization sequence truncated in the time domain or the frequency domain of the target synchronization sequence is one or more first short sequences and/or one or more second short sequences within the target synchronization sequence, wherein the first short sequence comprises a plurality of sequence points and the second short sequence comprises a plurality of sequence points.

Optionally, the detection module comprises:

a correlation submodule, configured to perform a correlation processing on the target synchronization sequence with a preset synchronization sequence;

a spacing determination submodule, configured to determine a subcarrier spacing with which the base station transmits the target synchronization sequence, on the basis of the quantity of correlated peaks derived from the correlation processing; and a synchronization detection submodule, configured to perform the synchronization detection on the basis of the subcarrier spacing and the truncated synchronization sequence.

Optionally, in a case that the target synchronization sequence is a ZC sequence and a length of the ZC sequence is odd and equal to a square of N, the synchronization sequence truncated in the time domain of the target synchronization sequence is a sequence which is a one-$X^{th}$ sequence segment of the target synchronization sequence, and the truncated synchronization sequence is a ZC sequence, wherein a length of the ZC sequence is an integer multiple of X, and X is an integer greater than or equal to 2.

Optionally, the detection submodule comprises:

a preprocessing module, configured to calculate a $p^{th}$ power of the truncated synchronization sequence to obtain a to-be-detected sequence, wherein p is an integer greater than or equal to 2; and a detection unit, configured to perform the synchronization detection on the basis of the to-be-detected sequence.

Another embodiment of the present disclosure provides a device for transmitting a synchronization sequence, comprising: a processor, a memory and a transceiver, wherein:

the processor is configured to read a program in the memory and perform the following process:

setting a target synchronization sequence, wherein at least one segment of sequence truncated in a time domain or a frequency domain of the target synchronization sequence is a synchronization sequence; and transmitting the target synchronization sequence to a user equipment via the transceiver, wherein the transceiver is configured to transmit and receiving data, and the memory is configured to store data to be used by the processor when performing operations.

Another embodiment of the present disclosure provides a device for synchronization detection, comprising: a processor, a memory and a transceiver, wherein:

the processor is configured to read a program in the memory and perform the following process:

receiving a target synchronization sequence transmitted by a base station via the transceiver; and performing synchronization detection on the basis of the target synchronization sequence, wherein the transceiver is configured to transmit and receive data, and the memory is configured to store data to be used by the processor when performing operations.

The technical solutions of the present disclosure have at least following advantageous effects:

According to the method for transmitting the synchronization sequence, and the method and the device for synchronization detection of the embodiments of the present disclosure, the target synchronization sequence with good autocorrelation characteristic is preset at base station side, sequences truncated in the time domain or the frequency domain of the target synchronization sequence can still be used as synchronization sequence, and the truncated sub-synchronization sequences have good autocorrelation characteristic and good cross-correlation characteristic therebetween. As a result, for user equipments with different bandwidths or different carrier spacings, after the same target synchronization sequence is transmitted at a base station side, the user equipments are capable of truncating respective sub-synchronization sequences in accordance with their own requirements to perform synchronization detection, thus not only ensuring the synchronization detection accuracy, but also broadening the application scope of the target synchronization sequence.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Figure 1:
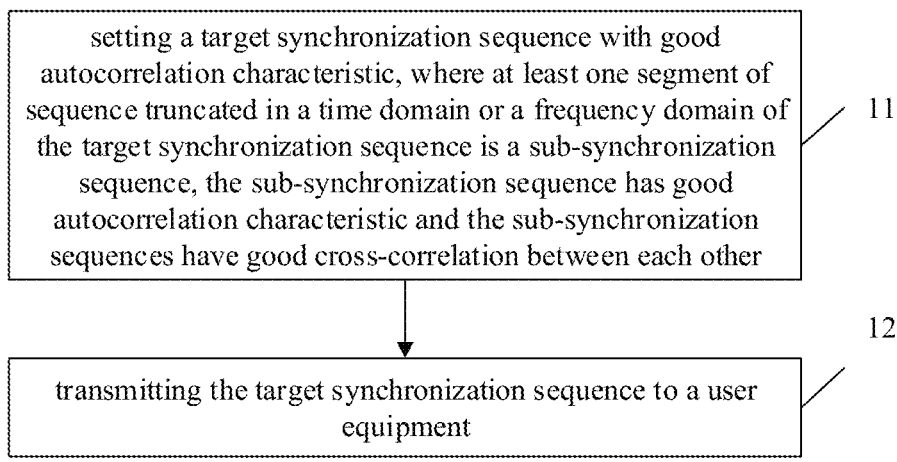
FIG. 1 illustrates a flow chart of a method for transmitting a synchronization sequence provided in some embodiments of the present disclosure.

As shown in FIG. 1, some embodiments of the present disclosure provide a method for transmitting a synchronization sequence, including:

Step 11, setting a target synchronization sequence with good autocorrelation characteristic, where at least one segment of sequence truncated in a time domain or a frequency domain of the target synchronization sequence is a sub-synchronization sequence, the sub-synchronization sequence has good autocorrelation characteristic and the sub-synchronization sequences have good cross-correlation characteristic therebetween; and Step 12, transmitting the target synchronization sequence to a user equipment.

The embodiment of the present disclosure described with reference to FIG. 1 is applicable to a base station side, the target synchronization sequence is set by the base station side and the target synchronization sequence has good autocorrelation and cross-correlation characteristics. Further, one or more sequence segments truncated in the time domain or the frequency domain of the target synchronization sequence according to a preset rule can be used as synchronization sequences, which are named sub-synchronization sequences, and the sub-synchronization sequences also have good autocorrelation and cross-correlation characteristics.

After the base station side has transmitted the same target synchronization sequence, user equipments with different bandwidths or different carrier spacings are capable of truncating respective sub-synchronization sequences in accordance with their own requirements to perform synchronization detection.

Further, the step 11 in the embodiment of the present disclosure described with reference to FIG. 1 includes:

Step 111, obtaining a reference synchronization sequence with good autocorrelation characteristic; and Step 112, rearranging, in accordance with a preset rule, multiple sequence points of the reference synchronization sequence, to obtain the target synchronization sequence with good autocorrelation characteristic.

The preset rule may be set in accordance with properties of the reference synchronization sequence; in specific, in a case that the target synchronization sequence is not susceptible to carrier spacings, at least one segment of sequence truncated in the time domain of the target synchronization sequence is the sub-synchronization sequence; and in a case that the target synchronization sequence is not susceptible to bandwidths, at least one segment of sequence truncated in the frequency domain of the target synchronization sequence is the sub-synchronization sequence.

The descriptions of the sub-synchronization sequence in the time domain and the sub-synchronization sequence in the frequency domain are provided as follows: first, a case in which the sub-synchronization sequence is a sequence truncated in the time domain of the target synchronization sequence is described:

There may be two scenarios as follows: first, the reference synchronization sequence is a ZC sequence and a length of the ZC sequence is even; second, the reference synchronization sequence is a ZC sequence, and a length of the ZC sequence is odd and equal to a square of N; where the ZC (Zadoff-Chu) sequence is also referred to as Generalized Chirped Sequence.

In the first scenario, in a case that the reference synchronization sequence is a ZC sequence and a length of the ZC sequence is even, the step 112 includes:

Step 1123, extracting the sequence points from the reference synchronization sequence at equal intervals and placing the extracted sequence points sequentially to obtain the target synchronization sequence with good autocorrelation characteristic.

Further, the step 1123 includes:

Step 11231, extracting even-numbered sequence points and odd-numbered sequence points from the reference synchronization sequence;

Step 11232, partitioning the even-numbered sequence points into multiple first short sequences, and partitioning the odd-numbered sequence points into multiple second short sequences, each of the multiple first short sequences includes multiple successive even-numbered sequence points and each of the multiple second short sequences includes multiple successive odd-numbered sequence points; and Step 11233, arranging, in accordance with a preset order, the multiple first short sequences and the multiple second short sequences, to obtain the target synchronization sequence with good autocorrelation characteristic.

The step 11233 includes:

placing the first short sequences and the second short sequences alternately, to obtain the target synchronization sequence with good autocorrelation characteristic.

For example, when the length of the reference synchronization sequence is an integer multiple of 4, the step 11232 includes: partitioning the even-numbered sequence points into 2 first short sequences: short sequence 1 and short sequence 2; and partitioning the odd-numbered sequence points into 2 second short sequences: short sequence 3 and short sequence 4. The short sequence 1 is a preceding half of the even-numbered sequence points in the reference synchronization sequence, the short sequence 2 is a latter half of the even-numbered sequence points in the reference synchronization sequence; the short sequence 3 is a preceding half of the odd-numbered sequence points in the reference synchronization sequence, the short sequence 4 is a latter half of the odd-numbered sequence points in the reference synchronization sequence.

Placing the first short sequences and the second short sequences alternately refers to that: in the rearranged target sequence, the short sequence 3 or 4 is between the short sequence 1 and the short sequence 2, and the short sequence 1 or 2 is between the short sequence 3 and the short sequence 4. For example, the target synchronization sequence may be [short sequence 1, short sequence 3, short sequence 2, short sequence 4], [short sequence 1, short sequence 4, short sequence 2, short sequence 3], [short sequence 2, short sequence 3, short sequence 1, short sequence 4], or [short sequence 2, short sequence 4, short sequence 1, short sequence 3]. In the same way, a short sequence formed by odd-numbered sequence points may be placed in the first position, and detailed enumeration thereof is omitted here.

It is to be noted that, the manner of placing the first short sequences and the second short sequences alternately is merely a preferred embodiment of the present application. Other placement orders may also be applied to the present application. For example, multiple first short sequences are placed successively, then multiple second short sequences are placed successively; or, multiple second short sequences are placed successively, then multiple first short sequences are placed successively. In short, the even-numbered sequence points in the reference synchronization sequence are placed before the odd-numbered sequence points in the reference synchronization sequence to obtain the target synchronization sequence with good autocorrelation characteristic; or the odd-numbered sequence points in the reference synchronization sequence are placed before the even-numbered sequence points in the reference synchronization sequence to obtain the target synchronization sequence with good autocorrelation characteristic.

Further, in the embodiment of the present disclosure, in a case that a result of dividing a length of the reference synchronization sequence by 4 is even, the multiple first short sequences are ZC sequences; and in a case that the result of dividing the length of the reference synchronization sequence by 4 is odd, the multiple second short sequences are ZC sequences.

When the length of the reference synchronization sequence is even, in a case that one-fourth of the length of the reference synchronization sequence is even, the short sequence 1 and the short sequence 2 are ZC sequences, and in a case that one-fourth of the length of the reference synchronization sequence is odd, the short sequence 3 and the short sequence 4 are ZC sequences.

In a case that the reference synchronization sequence is a ZC sequence and a length of the ZC sequence is even, the step 112 further includes:

Step 1121, truncating even-numbered sequence points and odd-numbered sequence points of the reference synchronization sequence;

Step 1122, placing the even-numbered sequence points of the reference synchronization sequence before the odd-numbered sequence points of the reference synchronization sequence to obtain the target synchronization sequence with good autocorrelation characteristic; or placing the odd-numbered sequence points of the reference synchronization sequence before the even-numbered sequence points of the reference synchronization sequence to obtain the target synchronization sequence with good autocorrelation characteristic.

For example, in a case that the reference synchronization sequence includes {sequence point 1, sequence point 2, sequence point 3, sequence point 4, sequence point 5, sequence point 6, sequence point 7, sequence point 8}, the target synchronization sequence is {sequence point 2, sequence point 4, sequence point 6, sequence point 8, sequence point 1, sequence point 3, sequence point 5, sequence point 7}, or the target synchronization sequence is {sequence point 1, sequence point 3, sequence point 5, sequence point 7, sequence point 2, sequence point 4, sequence point 6, sequence point 8}.

Further, when a preceding half of the target synchronization sequence is the even-numbered sequence points of the reference synchronization sequence and a latter half of the target synchronization sequence is the odd-numbered sequence points of the reference synchronization sequence, i.e., the target synchronization sequence is {sequence point 2, sequence point 4, sequence point 6, sequence point 8, sequence point 1, sequence point 3, sequence point 5, sequence point 7}, in a case that the result of dividing a length of the ZC sequence by 4 is even, the sub-synchronization sequence truncated in the time domain of the target synchronization sequence is a sequence which is a first one-fourth sequence segment of the target synchronization sequence and/or a second one-fourth sequence segment of the target synchronization sequence, and the sub-synchronization sequence is a ZC sequence; i.e., the sub-synchronization sequence is {sequence point 2, sequence point 4} or {sequence point 6, sequence point 8};

in a case that the result of dividing a length of the ZC sequence by 4 is odd, the sub-synchronization sequence truncated in the time domain of the target synchronization sequence is a sequence which is a third one-fourth sequence segment of the target synchronization sequence and/or a fourth one-fourth sequence segment of the target synchronization sequence, and the sub-synchronization sequence is a ZC sequence; and detailed examples thereof are omitted here.

Or, when a preceding half of the target synchronization sequence is the odd-numbered sequence points of the reference synchronization sequence and a latter half of the target synchronization sequence is the even-numbered sequence points of the reference synchronization sequence, i.e., the target synchronization sequence is {sequence point 1, sequence point 3, sequence point 5, sequence point 7, sequence point 2, sequence point 4, sequence point 6, sequence point 8}, in a case that the result of dividing a length of the ZC sequence by 4 is odd, the sub-synchronization sequence truncated in the time domain of the target synchronization sequence is a sequence which is a first one-fourth sequence segment of the target synchronization sequence and/or a second one-fourth sequence segment of the target synchronization sequence, and the sub-synchronization sequence is a ZC sequence; and detailed examples thereof are omitted here;

in a case that the result of dividing a length of the ZC sequence by 4 is even, the sub-synchronization sequence truncated in the time domain of the target synchronization sequence is a sequence which is a third one-fourth sequence segment of the target synchronization sequence and/or a fourth one-fourth sequence segment of the target synchronization sequence, and the sub-synchronization sequence is a ZC sequence; i.e., the sub-synchronization sequence is {sequence point 2, sequence point 4} or {sequence point 6, sequence point 8}.

A detailed proving process is as follows:

Assuming an even ZC sequence is:

$$z(n) = \exp\left(\frac{-j\pi q n^2}{N_{zc}}\right)$$

The sequence has the following properties:

When $N_{zc}/4$ is even, the preceding half of even-numbered points in $z(n)$ is also a ZC sequence.

Proof: let $n=2m$, $m=0,1,\ldots,N_{zc}/4$, the following formula can be derived:

$$z_1(m) = z(2m) = \exp\left(\frac{-j\pi q(2m)^2}{N_{zc}}\right) = \exp\left(\frac{-j\pi q m^2}{N_{zc}/4}\right)$$

Then when $N_{zc}/4$ is even, $z_1(m)$ is a ZC sequence.

When $N_{zc}/4$ is even, the latter half of even-numbered points in $z(n)$ is also a ZC sequence.

Proof: let $n=2m$, $m=0,1,\ldots,N_{zc}/4$, the following formula can be derived:

$$z_2(m) = z(2(m+N_{zc}/4)) = \exp\left(\frac{-j\pi q(2(m+N_{zc}/4))^2}{N_{zc}}\right) =$$

$$\exp\left(\frac{-j\pi q(4m^2 + 2N_{zc}m + N_{zc}^2/4)}{N_{zc}}\right) = \exp\left(\frac{-j\pi q m^2}{64}\right)$$

when $N_{zc}/4$ is even, $z_2(m)$ is a ZC sequence.

When $N_{zc}/4$ is odd, the preceding half of odd-numbered points in $z(n)$ is also a ZC sequence.

Proof: let $n=2m$, $m=0,1$, the following formula can be derived:

$$z_3(m) = z(2m+1) = \exp\left(\frac{-j\pi q(2m+1)^2}{N_{zc}}\right) =$$

$$\exp\left(\frac{-j\pi q(4m^2 + 4m + 1^2)}{N_{zc}}\right) = A_1 \exp\left(\frac{-j\pi q m(m+1)}{N_{zc}/4}\right)$$

when $N_{zc}/4$ is odd, $z_3(m)$ is a ZC sequence, where $$A_1 = \exp\left(\frac{-j\pi q}{N_{zc}}\right).$$

When $N_{zc}/4$ is odd, the latter half of odd-numbered points in $z(n)$ is also a ZC sequence.

Proof: let $n=2m$, $m=0,1,\ldots,N_{zc}/4$, the following formula can be derived:

$$z_3(m) = z(2m+Nzc/2+1) = \exp\left(\frac{-j\pi q(2m+1+N_{zc}/2)^2}{N_{zc}}\right) =$$

$$\exp\left(\frac{-j\pi q(4m^2 + 4m + Nzc + 1)}{N_{zc}}\right) = A_2 \exp\left(\frac{-j\pi q m(m+1)}{N_{zc}/4}\right)$$

When $N_{zc}/4$ is odd, $z_4(m)$ is a ZC sequence, where $$A_2 = \exp\left(\frac{-j\pi q(N_{zc}+1)}{N_{zc}}\right).$$

In the second scenario, in a case that the reference synchronization sequence is a ZC sequence and a length of the ZC sequence is odd and equal to a square of N, the step 112 includes:

Step 1123, extracting a target sequence point, starting from $0^{th}$ sequence point of the reference synchronization sequence, from every N successive sequence points of the reference synchronization sequence; and Step 1124, placing the extracted target sequence points sequentially in preset positions of the reference synchronization sequence, to obtain the target synchronization sequence with good autocorrelation characteristic, where N is an integer greater than or equal to 3.

The preset positions are those with sequence numbers starting from integer multiples of N.

For example, in a case that the reference synchronization sequence includes {sequence point 1, sequence point 2, sequence point 3, sequence point 4, sequence point 5, sequence point 6, sequence point 7, sequence point 8, sequence point 9}, assuming N=3, then the target synchronization sequence is {sequence point 1, sequence point 4, sequence point 7, sequence point 2, sequence point 5, sequence point 8, sequence point 3, sequence point 6, sequence point 9}.

Further, in a case that the length of the ZC sequence is an integer multiple of X, the sub-synchronization sequence truncated in the time domain of the target synchronization sequence is a sequence which is a one-$X^{th}$ sequence segment of the target synchronization sequence, and the sub-synchronization sequence is a ZC sequence, where X is an integer greater than or equal to 2.

For example, assuming X=3 and the target synchronization sequence is {sequence point 1, sequence point 3, sequence point 4, sequence point 6, sequence point 2, sequence point 7, sequence point 8, sequence point 9, sequence point 5}, then the length of the target synchronization sequence is 9; since 9 is an integer multiple of 3, the sub-synchronization sequence is a sequence which is a one-third sequence segment of the target synchronization sequence, i.e., {sequence point 1, sequence point 3, sequence 4}, {sequence point 6, sequence point 2, sequence point 7}, or {sequence point 8, sequence point 9, sequence point 5}.

Further, a case in which the sub-synchronization sequence is a sequence truncated in the frequency domain of the target synchronization sequence is described. In this case, the reference synchronization sequence is a ZC sequence and a length of the ZC sequence is even. The step 112 includes:

Step 1125, truncating even-numbered sequence points and odd-numbered sequence points of the reference synchronization sequence;

Step 1126, placing the even-numbered sequence points of the reference synchronization sequence before the odd-numbered sequence points of the reference synchronization sequence to obtain a rearranged sequence; or placing the odd-numbered sequence points of the reference synchronization sequence before the even-numbered sequence points of the reference synchronization sequence to obtain the rearranged sequence; and Step 1127, mapping the rearranged sequence to subcarriers in the frequency domain respectively and performing an inverse Fourier transformation on the mapped rearranged sequence to obtain the target synchronization sequence with good autocorrelation characteristic.

The sub-synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the sub-synchronization sequence is a ZC sequence.

Similarly, it can be proved on the basis of the formula of even ZC sequence that the sub-ZC-sequence for each carrier can be used as synchronization sequence, i.e., the sub-ZC-sequence having good autocorrelation and cross-correlation characteristics. A detail description thereof is omitted here.

In summary, according to the embodiment of the present disclosure described with reference to FIG. 1, the target synchronization sequence with good autocorrelation characteristic is preset at the base station side, the target synchronization sequence is not susceptible to carrier spacings and system bandwidths, and requirements of users with different system bandwidths and carrier spacings can be met.

In specific, the sequence truncated in the time domain or the frequency domain of the target synchronization sequence can still be used as the synchronization sequence, and the truncated sub-synchronization sequence has good autocorrelation and cross-correlation characteristics; as a result, after the base station side has transmitted the same target synchronization sequence, user equipments with different bandwidths or different carrier spacings are capable of truncating respective sub-synchronization sequences in accordance with their own requirements to perform synchronization detection, thus not only ensuring the synchronization detection accuracy, but also broadening the application scope of the target synchronization sequence.

Figure 2:
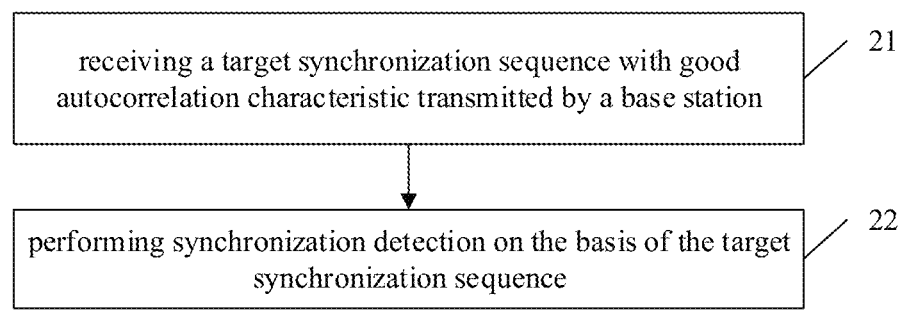
FIG. 2 illustrates a flow chart of a method for synchronization detection provided in some embodiments of the present disclosure.

As shown in FIG. 2, some embodiments of the present disclosure provide a method for synchronization detection, including:

Step 21, receiving a target synchronization sequence with good autocorrelation characteristic transmitted by a base station; and Step 22, performing synchronization detection on the basis of the target synchronization sequence.

The embodiment of the present disclosure described with reference to FIG. 2 is applicable to a user equipment side, that is, the user equipment side receives the target synchronization sequence transmitted by the base station and performs synchronization detection in accordance with its own requirements and the received target synchronization sequence, to achieve synchronization and timing.

The step 22 in the embodiment of the present disclosure described with reference to FIG. 2 includes:

Step 221, truncating a segment of sequence in a time domain or a frequency domain of the target synchronization sequence as a sub-synchronization sequence which has good autocorrelation characteristic; the target synchronization sequence is not susceptible to carrier spacings and system bandwidths, therefore requirements of users with different system bandwidths and carrier spacings can be met; in brief, the subsequence truncated by the user equipment in the frequency domain or the time domain of the target synchronization sequence can still be used as synchronization sequence.

Step 222, performing the synchronization detection on the basis of the sub-synchronization sequence.

In a case that the target synchronization sequence is a ZC sequence and a length of the ZC sequence is even, the sub-synchronization sequence truncated in the time domain or the frequency domain of the target synchronization sequence is one or more first short sequences and/or one or more second short sequences within the target synchronization sequence, the first short sequence includes multiple sequence points and the second short sequence includes multiple sequence points.

It is to be noted that, specific quantities of sequence points in the first short sequence and the second short sequence respectively are to be determined in consideration of what number having an integer multiple equal to the length of the reference synchronization sequence, thus a specific limitation thereof is not given herein.

In a case that the target synchronization sequence is a ZC sequence and a length of the ZC sequence is even and is an integer multiple of 4, the sub-synchronization sequence truncated in the time domain or the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence or a fourth one-fourth sequence segment of the target synchronization sequence, and the sub-synchronization sequence is a ZC sequence.

It is to be noted that, which one of the one-fourth sequence segments being usable as the sub-synchronization sequence is determined by the fact that the result of dividing the length of the target synchronization sequence by 4 is odd or even, as well as the characteristic of the target synchronization sequence. In specific, the characteristic of the target synchronization sequence may be indicated by the base station side, thus a specific limitation thereof is not given herein.

Correspondingly, the step 22 includes:

Step 223, performing a correlation processing on the target synchronization sequence by using a preset synchronization sequence;

Step 224, determining a subcarrier spacing with which the base station transmits the target synchronization sequence, on the basis the quantity of correlated peaks derived from the correlation processing; and Step 225, performing the synchronization detection on the basis of the subcarrier spacing and the sub-synchronization sequence.

In specific, in a case that the subcarrier spacing utilized by the base station (i.e., transmitting end) is not known to the receiving end, the subcarrier spacing may be determined in accordance with the quantity of correlated peaks derived from the correlation processing on the synchronization sequence.

Taking a target synchronization sequence being [short sequence 1, short sequence 3, short sequence 2, short sequence 4] as an example, when the subcarrier spacing is 15 kHz, the transmitted target synchronization sequence is [short sequence 1, short sequence 3, short sequence 2, short sequence 4], when the subcarrier spacing is 30 kHz, the transmitted target synchronization sequence is [short sequence 1, short sequence 3], and when the subcarrier spacing is 60 kHz, the transmitted target synchronization sequence is [short sequence 1].

When the user at the the receiving end is performing detection, the subcarrier spacing utilized by the transmitting end may be determined on the basis of the quantity of correlated peaks. For example, in a case that the subcarrier spacing utilized by the transmitting end is 15 kHz, then two peaks are detected when the user performs correlation by using a preset synchronization sequence of 60 kHz: [short sequence 1] as the local sequence; in a case that the subcarrier spacing utilized by the transmitting end is 60 kHz, then one peak is detected when the user performs correlation by using the preset synchronization sequence of 60 kHz: [short sequence 1]; in a case that the subcarrier spacing utilized by the transmitting end is 30 kHz, then only one peak is detected by the user when the user performs correlation by using the preset synchronization sequence of 60 kHz: [short sequence 1], while one peak is also detected by the user when the user performs correlation by using the [short sequence 3], however, in the case that the subcarrier spacing utilized by the transmitting end is 60 kHz, no peak is detected when the user performs correlation by using the short sequence 3. The subcarrier spacing utilized by the transmitting end may thereby be determined, thus enabling the synchronization detection.

Or, in a case that the target synchronization sequence is a ZC sequence and a length of the ZC sequence is odd and equal to a square of N, the sub-synchronization sequence truncated in the time domain of the target synchronization sequence is a sequence which is a one-$X^{th}$ sequence segment of the target synchronization sequence, and the sub-synchronization sequence is a ZC sequence, where a length of the ZC sequence is an integer multiple of X, and X is an integer greater than or equal to 2. For example, in a case that the length of the ZC sequence is 15 and X is 3, the sub-synchronization sequence is a sequence which is any one-third sequence segment of the target synchronization sequence.

In the embodiment of the present disclosure, performing the synchronization detection on the basis of the sub-synchronization sequence by the user equipment includes:

calculating a $p^{th}$ power of the sub-synchronization sequence to obtain a to-be-detected sequence, i.e., preprocessing the sub-synchronization sequence; where p is an integer greater than or equal to 2; and performing the synchronization detection on the basis of the to-be-detected sequence, i.e., performing the synchronization detection on the preprocessed signal.

Optionally, receiving processing includes the preprocessing and the synchronization detection. The synchronization detection utilizes conventional algorithm, thus a description thereof is omitted. The preprocessing algorithm used to perform detection on the target synchronization sequence is as follows: assuming the received signal is y(n) where n=0,1,2,3 . . . , let $y_1(2m)=y(4m)$, $y_1(2m+1)=0$;

$$y_2(2m+1) = y(4m+3), y_2(2m) = 0;$$

$$r(m) = y_1(m) + y_2(m) * \exp\left(\frac{j2\pi m}{N_{zc}}\right);$$

where r(m) is used to perform synchronization correlation detection.

In summary, according to the embodiment of the present disclosure described with reference to FIG. 2, having received the target synchronization sequence, user equipments truncates respective sub-synchronization sequences in accordance with their own requirements to perform the synchronization detection, thus not only ensuring the synchronization detection accuracy, but also broadening the application scope of the target synchronization sequence; in specific, the target synchronization sequence is not susceptible to carrier spacings and system bandwidths, therefore requirements of users with different system bandwidths and carrier spacings can be met.

Figure 3:
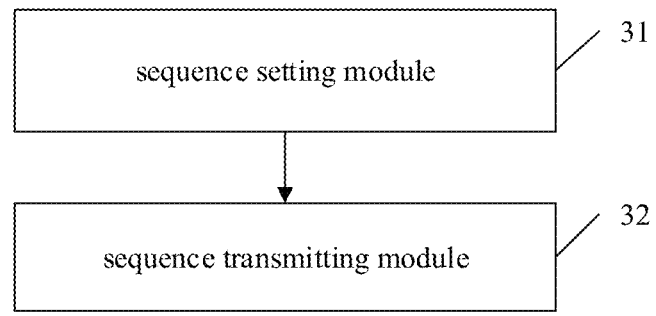
FIG. 3 illustrates a schematic structural diagram of a device for transmitting a synchronization sequence provided in some embodiments of the present disclosure.

As shown in FIG. 3, some embodiments of the present disclosure provide a device for transmitting a synchronization sequence, including:

a sequence setting module 31, which is configured to set a target synchronization sequence with good autocorrelation characteristic, where at least one segment of sequence truncated in a time domain or a frequency domain of the target synchronization sequence is a sub-synchronization sequence, the sub-synchronization sequence has good auto-correlation characteristic and the sub-synchronization sequences have good cross-correlation between each other; and a sequence transmitting module 32, which is configured to transmit the target synchronization sequence to a user equipment.

The sequence setting module in the embodiment of the present disclosure described with reference to FIG. 3 includes:

a reference obtaining module, which is configured to obtain a reference synchronization sequence with good autocorrelation characteristic; and a rearranging module, which is configured to rearrange, in accordance with a preset rule, multiple sequence points of the reference synchronization sequence, to obtain the target synchronization sequence with good autocorrelation characteristic.

The rearranging module in the embodiment of the present disclosure described with reference to FIG. 3 includes:

a first rearranging submodule, which is configured to extract, in a case that the reference synchronization sequence is a ZC sequence and a length of the ZC sequence is even, the sequence points from the reference synchronization sequence at equal intervals and place the extracted sequence points sequentially to obtain the target synchronization sequence with good autocorrelation characteristic.

The first rearranging submodule in the embodiment of the present disclosure described with reference to FIG. 3 includes:

a first extracting unit, which is configured to extract even-numbered sequence points and odd-numbered sequence points from the reference synchronization sequence;

a first partitioning unit, which is configured to partition the even-numbered sequence points into multiple first short sequences, and partition the odd-numbered sequence points into multiple second short sequences, where each of the multiple first short sequences includes multiple successive even-numbered sequence points and each of the multiple second short sequences includes multiple successive odd-numbered sequence points; and a rearranging unit, which is configured to arrange, in accordance with a preset order, the multiple first short sequences and the multiple second short sequences, to obtain the target synchronization sequence with good autocorrelation characteristic.

The rearranging unit in the embodiment of the present disclosure described with reference to FIG. 3 includes:

a rearranging subunit, which is configured to place the first short sequences and the second short sequences alternately, to obtain the target synchronization sequence with good autocorrelation characteristic.

In the embodiment of the present disclosure described with reference to FIG. 3, in a case that a result of dividing a length of the reference synchronization sequence by 4 is even, the multiple first short sequences are ZC sequences; and in a case that the result of dividing the length of the reference synchronization sequence by 4 is odd, the multiple second short sequences are ZC sequences.

The rearranging module in the embodiment of the present disclosure described with reference to FIG. 3 includes:

a first truncating submodule, which is configured to truncate, in a case that the reference synchronization sequence is a ZC sequence, and a length of the ZC sequence is even, even-numbered sequence points and odd-numbered sequence points of the reference synchronization sequence; and a first rearranging submodule, which is configured to place the even-numbered sequence points of the reference synchronization sequence before the odd-numbered sequence points of the reference synchronization sequence to obtain the target synchronization sequence with good autocorrelation characteristic; or place the odd-numbered sequence points of the reference synchronization sequence before the even-numbered sequence points of the reference synchronization sequence to obtain the target synchronization sequence with good autocorrelation characteristic.

In the embodiment of the present disclosure described with reference to FIG. 3, when a preceding half of the target synchronization sequence is the even-numbered sequence points of the reference synchronization sequence and a latter half of the target synchronization sequence is the odd-numbered sequence points of the reference synchronization sequence, in a case that the result of dividing a length of the ZC sequence by 4 is even, the sub-synchronization sequence truncated in the time domain of the target synchronization sequence is a sequence which is a first one-fourth sequence segment of the target synchronization sequence and/or a second one-fourth sequence segment of the target synchronization sequence, and the sub-synchronization sequence is a ZC sequence;

in a case that the result of dividing a length of the ZC sequence by 4 is odd, the sub-synchronization sequence truncated in the time domain of the target synchronization sequence is a sequence which is a third one-fourth sequence segment of the target synchronization sequence and/or a fourth one-fourth sequence segment of the target synchronization sequence, and the sub-synchronization sequence is a ZC sequence.

In the embodiment of the present disclosure described with reference to FIG. 3, when a preceding half of the target synchronization sequence is the odd-numbered sequence points of the reference synchronization sequence and a latter half of the target synchronization sequence is the even-numbered sequence points of the reference synchronization sequence, in a case that the result of dividing a length of the ZC sequence by 4 is odd, the sub-synchronization sequence truncated in the time domain of the target synchronization sequence is a sequence which is a first one-fourth sequence segment of the target synchronization sequence and/or a second one-fourth sequence segment of the target synchronization sequence, and the sub-synchronization sequence is a ZC sequence;

in a case that the result of dividing a length of the ZC sequence by 4 is even, the sub-synchronization sequence truncated in the time domain of the target synchronization sequence is a sequence which is a third one-fourth sequence segment of the target synchronization sequence and/or a fourth one-fourth sequence segment of the target synchronization sequence, and the sub-synchronization sequence is a ZC sequence.

The rearranging module in the embodiment of the present disclosure described with reference to FIG. 3 includes:

an extracting submodule, which is configured to extract, in a case that the reference synchronization sequence is a ZC sequence, and a length of the ZC sequence is odd and equal to a square of N, a target sequence point, starting from $0^{th}$ sequence point of the reference synchronization sequence, from every N successive sequence points of the reference synchronization sequence; and a second rearranging submodule, which is configured to place the extracted target sequence points sequentially in preset positions of the reference synchronization sequence, to obtain the target synchronization sequence with good autocorrelation characteristic, where N is an integer greater than or equal to 3.

In the embodiment of the present disclosure described with reference to FIG. 3, the preset positions are those with sequence numbers starting from integer multiples of N.

In the embodiment of the present disclosure described with reference to FIG. 3, in a case that the length of the ZC sequence is an integer multiple of X, the sub-synchronization sequence truncated in the time domain of the target synchronization sequence is a sequence which is a one-$X^{th}$ sequence segment of the target synchronization sequence, and the sub-synchronization sequence is a ZC sequence, where X is an integer greater than or equal to 2.

The rearranging module includes:

a second truncating submodule, which is configured to truncate, in a case that the reference synchronization sequence is a ZC sequence and a length of the ZC sequence is even, even-numbered sequence points and odd-numbered sequence points of the reference synchronization sequence;

a third rearranging submodule, which is configured to place the even-numbered sequence points of the reference synchronization sequence before the odd-numbered sequence points of the reference synchronization sequence to obtain a rearranged sequence; or place the odd-numbered sequence points of the reference synchronization sequence before the even-numbered sequence points of the reference synchronization sequence to obtain the rearranged sequence; and a frequency-domain-mapping submodule, which is configured to map the rearranged sequence to subcarriers in the frequency domain respectively and perform an inverse Fourier transformation on the mapped rearranged sequence to obtain the target synchronization sequence with good autocorrelation characteristic.

In the embodiment of the present disclosure described with reference to FIG. 3, the sub-synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the sub-synchronization sequence is a ZC sequence.

In summary, according to the embodiment of the present disclosure described with reference to FIG. 3, the target synchronization sequence with good autocorrelation characteristic is preset at the base station side, and the target synchronization sequence is not susceptible to carrier spacings and system bandwidths, therefore requirements of users with different system bandwidths and carrier spacings can be met. In specific, the sequence truncated in the time domain or the frequency domain of the target synchronization sequence can still be used as the synchronization sequence, and the truncated sub-synchronization sequence has good autocorrelation and cross-correlation characteristics; as a result, after the base station side has transmitted the same target synchronization sequence, user equipments with different bandwidths or different carrier spacings are capable of truncating respective sub-synchronization sequences in accordance with their own requirements to perform the synchronization detection, thus not only ensuring the synchronization detection accuracy, but also broadening the application scope of the target synchronization sequence.

It is to be noted that, the device for transmitting the synchronization sequence that is provided in the embodiment of the present disclosure described with reference to FIG. 3 is capable of implementing the method for transmitting the synchronization sequence provided in the embodiment described with reference to FIG. 1, all the aforementioned embodiments of the method for transmitting the synchronization sequence are applicable to the device and the same or similar beneficial effects can be achieved.

Figure 4:
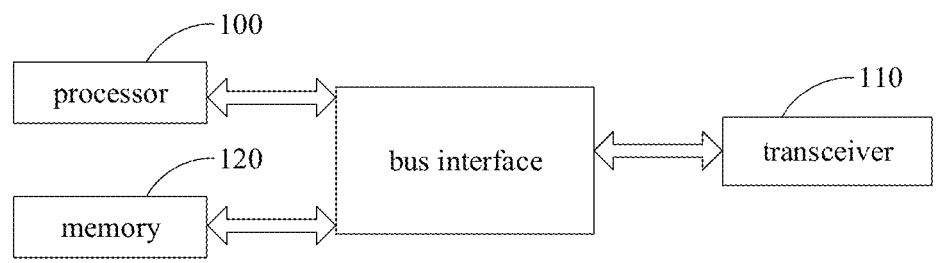
FIG. 4 illustrates a schematic structural diagram of a device for transmitting a synchronization sequence and a device for synchronization detection provided in some embodiments of the present disclosure.

As shown in FIG. 4, some embodiments of the present disclosure provide a device for transmitting a synchronization sequence, including: a processor 100, a memory 120 connected to the processor 100 via a bus interface, and a transceiver 110 connected to the processor 100 via the bus interface. The memory is configured to store programs and data to be used by the processor when executing operations, and the transceiver 110 is configured to transmit control commands, etc. When calling and executing the programs and data stored in the memory, the processor is configured to implement the following functional modules:

a sequence setting module, which is configured to setting a target synchronization sequence with good autocorrelation characteristic, where at least one segment of sequence truncated in a time domain or a frequency domain of the target synchronization sequence is a sub-synchronization sequence, the sub-synchronization sequence has good autocorrelation characteristic and the sub-synchronization sequences have good cross-correlation between each other; and a sequence transmitting module, which is configured to transmit the target synchronization sequence to a user equipment.

A bus architecture in FIG. 4 may include an arbitrary quantity of buses and bridges connected to each other. Various circuits of one or more processors represented by the processor 100 and a memory represented by the memory 120 are coupled. The bus architecture may further couple other circuits together, such as a periphery component, a voltage stabilizer and a power management circuit. A bus interface is for providing an interface. The transceiver 110 may be multiple elements, i.e., including a receiver and a transmitter, and provides a unit configured to communicate with other devices on a transmission medium. The processor 100 is in charge of managing the bus architecture and common processes. The memory 120 may be configured to store data to be used by the processor 100 when performing operations.

The processor 100 is in charge of managing the bus architecture and common processes. The memory 120 may be configured to store data to be used by the processor 100 when performing operations.

It is to be noted that, the device for transmitting the synchronization sequence that is provided in the embodiment of the present disclosure described with reference to FIG. 4 is capable of implementing the method for transmitting the synchronization sequence provided in the embodiment described with reference to FIG. 1, all the aforementioned embodiments of the method for transmitting the synchronization sequence are applicable to the device and the same or similar beneficial effects can be achieved.

Figure 5:
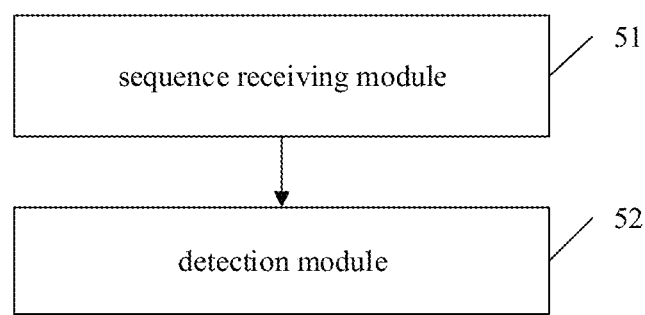
FIG. 5 illustrates a structural schematic diagram of a device for synchronization detection provided in some embodiments of the present disclosure.

As shown in FIG. 5, some embodiments of the present disclosure further provide a device for synchronization detection, including:

a sequence receiving module 51, which is configured to receive a target synchronization sequence with good autocorrelation characteristic transmitted by a base station; and a detection module 52, which is configured to perform synchronization detection on the basis of the target synchronization sequence.

The detection module in the embodiment of the present disclosure described with reference to FIG. 5 includes:

a truncating submodule, which is configured to truncate a segment of sequence in a time domain or a frequency domain of the target synchronization sequence as a sub-synchronization sequence, where the sub-synchronization sequence has good autocorrelation characteristic; and a detection submodule, which is configured to perform the synchronization detection on the basis of the sub-synchronization sequence.

In the embodiment of the present disclosure described with reference to FIG. 5, in a case that the target synchronization sequence is a ZC sequence and a length of the ZC sequence is even, the sub-synchronization sequence truncated in the time domain or the frequency domain of the target synchronization sequence is one or more first short sequences and/or one or more second short sequences within the target synchronization sequence, the first short sequence includes multiple sequence points and the second short sequence includes multiple sequence points.

The detection module in the embodiment of the present disclosure described with reference to FIG. 5 includes:

a correlation submodule, which is configured to perform a correlation processing on the target synchronization sequence by using a preset synchronization sequence;

a spacing determination submodule, which is configured to determine a subcarrier spacing with which the base station transmits the target synchronization sequence, on the basis of the quantity of correlated peaks derived from the correlation processing; and a synchronization detection submodule, which is configured to perform the synchronization detection on the basis of the subcarrier spacing and the sub-synchronization sequence.

In the embodiment of the present disclosure described with reference to FIG. 5, in a case that the target synchronization sequence is a ZC sequence and a length of the ZC sequence is even, the sub-synchronization sequence truncated in the time domain or the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence or a fourth one-fourth sequence segment of the target synchronization sequence, and the sub-synchronization sequence is a ZC sequence.

In the embodiment of the present disclosure described with reference to FIG. 5, in a case that the target synchronization sequence is a ZC sequence and a length of the ZC sequence is odd and equal to a square of N, the sub-synchronization sequence truncated in the time domain of the target synchronization sequence is a sequence which is a one-$X^{th}$ sequence segment of the target synchronization sequence, and the sub-synchronization sequence is a ZC sequence, where a length of the ZC sequence is an integer multiple of X, and X is an integer greater than or equal to 2.

The detection submodule in the embodiment of the present disclosure described with reference to FIG. 5 includes:

a preprocessing module, which is configured to calculate a $p^{th}$ power of the sub-synchronization sequence to obtain a to-be-detected sequence, where p is an integer greater than or equal to 2; and a detection unit, which is configured to perform the synchronization detection on the basis of the to-be-detected sequence.

In summary, according to the embodiment of the present disclosure described with reference to FIG. 5, having received the target synchronization sequence, user equipments truncates respective sub-synchronization sequences in accordance with their own requirements to perform the synchronization detection, thus not only ensuring the synchronization detection accuracy, but also broadening the application scope of the target synchronization sequence; in specific, the target synchronization sequence is not suscep-tible to carrier spacings and system bandwidths, therefore requirements of users with different system bandwidths and carrier spacings can be met.

It is to be noted that, the device for synchronization detection provided in the embodiment of the present disclosure described with reference to FIG. 5 is capable of implementing the method for synchronization detection provided in the embodiment described with reference to FIG. 2, all the aforementioned embodiments of the method for synchronization detection are applicable to the device and the same or similar beneficial effects can be achieved.

As shown in FIG. 4, some embodiments of the present disclosure provide a device for synchronization detection, including: a processor 100, a memory 120 connected to the processor 100 via a bus interface, and a transceiver 110 connected to the processor 100 via the bus interface; the memory is configured to store programs and data to be used by the processor in operation, the transceiver 110 is configured to transmit control commands, etc., and having invoked and executed the programs and data stored in the memory, the processor is configured to implement the following functional modules:

a sequence receiving module, which is configured to receive a target synchronization sequence with good auto-correlation characteristic transmitted by a base station; and a detection module, which is configured to perform synchronization detection on the basis of the target synchronization sequence.

A bus architecture in FIG. 4 may comprise an arbitrary quantity of buses and bridges connected to each other. Various circuits of one or more processors represented by the processor 100 and a memory represented by the memory 120 are coupled. The bus architecture may further couple other circuits together, such as a periphery component, a voltage stabilizer and a power management circuit. A bus interface is for providing an interface. The transceiver 110 may be multiple elements, i.e., including a receiver and a transmitter, and provides a unit configured to communicate with other devices on a transmission medium. The processor 100 is in charge of managing the bus architecture and common processes. The memory 120 may be configured to store data to be used by the processor 100 when performing operations.

The processor 100 is in charge of managing the bus architecture and common processes. The memory 120 may be configured to store data to be used by the processor 100 when performing operations.

It is to be noted that, the device for synchronization detection provided in the embodiment of the present disclosure described with reference to FIG. 4 is capable of implementing the method for synchronization detection provided in the embodiment described with reference to FIG. 2, all the aforementioned embodiments of the method for synchronization detection are applicable to the device and the same or similar beneficial effects can be achieved.

The above descriptions merely describe preferred embodiments of the present disclosure. It should be appreciated that various modifications and polishments can be made by those skilled in the art without departing from the principle of the present disclosure, and these modifications and polishments shall fall within the protection scope of the present disclosure.

What is claimed is:

1. A method for transmitting a synchronization sequence, comprising:

setting a target synchronization sequence, wherein at least one segment of sequence truncated in a time domain or a frequency domain of the target synchronization sequence is a sub-synchronization sequence; and transmitting the target synchronization sequence to a user equipment;

wherein the setting the target synchronization sequence comprises: obtaining a reference synchronization sequence; and rearranging, in accordance with a preset rule, a plurality of sequence points of the reference synchronization sequence, to obtain the target synchronization sequence; and wherein, in a case that the reference synchronization sequence is a Zadoff-Chu (ZC) sequence and a length of the ZC sequence is even, the rearranging, in accordance with the preset rule, the plurality of sequence points of the reference synchronization sequence, to obtain the target synchronization sequence comprises: extracting the sequence points from the reference synchronization sequence at equal intervals and placing the extracted sequence points sequentially to obtain the target synchronization sequence; or in a case that the reference synchronization sequence is a ZC sequence, and a length of the ZC sequence is odd and equal to a square of N, the rearranging, in accordance with the preset rule, the plurality of sequence points of the reference synchronization sequence, to obtain the target synchronization sequence comprises: extracting a target sequence point, starting from a $0^{th}$ sequence point of the reference synchronization sequence, from every N successive sequence points of the reference synchronization sequence; and placing the extracted target sequence points sequentially in preset positions of the reference synchronization sequence, to obtain the target synchronization sequence, wherein N is an integer greater than or equal to 3; or in a case that the reference synchronization sequence is a ZC sequence and a length of the ZC sequence is even, the rearranging, in accordance with the preset rule, the plurality of sequence points of the reference synchronization sequence, to obtain the target synchronization sequence comprises: truncating even-numbered sequence points and odd-numbered sequence points of the reference synchronization sequence; placing the even-numbered sequence points of the reference synchronization sequence before the odd-numbered sequence points of the reference synchronization sequence to obtain a rearranged sequence, or placing the odd-numbered sequence points of the reference synchronization sequence before the even-numbered sequence points of the reference synchronization sequence to obtain the rearranged sequence; and mapping the rearranged sequence to subcarriers in the frequency domain respectively and performing an inverse Fourier transformation on the mapped rearranged sequence to obtain the target synchronization sequence.

2. The method according to claim 1, wherein extracting the sequence points from the reference synchronization sequence at equal intervals and placing the extracted sequence points sequentially to obtain the target synchronization sequence comprises:

extracting even-numbered sequence points and odd-numbered sequence points from the reference synchronization sequence;

partitioning the even-numbered sequence points into a plurality of first short sequences, and partitioning the odd-numbered sequence points into a plurality of second short sequences, wherein the first short sequence comprises a plurality of successive even-numbered sequence points and the second short sequence comprises a plurality of successive odd-numbered sequence points; and arranging, in accordance with a preset order, the plurality of first short sequences and the plurality of second short sequences, to obtain the target synchronization sequence.

3. The method according to claim 2, wherein arranging, in accordance with the preset order, the plurality of first short sequences and the plurality of second short sequences, to obtain the target synchronization sequence comprises:

placing the first short sequences and the second short sequences alternately, to obtain the target synchronization sequence.

4. The method according to claim 2, wherein in a case that a result of dividing the length of the reference synchronization sequence by 4 is even, the plurality of first short sequences are ZC sequences; and in a case that the result of dividing the length of the reference synchronization sequence by 4 is odd, the plurality of second short sequences are ZC sequences.

5. The method according to claim 1, wherein the preset positions are those with sequence numbers starting from integer multiples of N.

6. The method according to claim 5, wherein in a case that the length of the ZC sequence is an integer multiple of X, the sub-synchronization sequence truncated in the time domain of the target synchronization sequence is a sequence which is a one-$X^{th}$ sequence segment of the target synchronization sequence, and the sub-synchronization sequence is a ZC sequence, wherein X is an integer greater than or equal to 2.

7. The method according to claim 1, wherein the sub-synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the sub-synchronization sequence is a ZC sequence.

8. A method for synchronization detection, comprising:

receiving a target synchronization sequence transmitted by a base station; and performing synchronization detection on the basis of the target synchronization sequence;

wherein the performing the synchronization detection on the basis of the target synchronization sequence comprises: truncating a segment of sequence in a time domain or a frequency domain of the target synchronization sequence as a sub-synchronization sequence; and performing the synchronization detection on the basis of the truncated sub-synchronization sequence; and wherein, in a case that the target synchronization sequence is a ZC sequence and a length of the ZC sequence is even, the sub-synchronization sequence truncated in the time domain or the frequency domain of the target synchronization sequence is one or more first short sequences and/or one or more second short sequences within the target synchronization sequence, wherein the first short sequence comprises a plurality of sequence points and the second short sequence comprises a plurality of sequence points; or in a case that the target synchronization sequence is a ZC sequence and a length of the ZC sequence is odd and equal to a square of N, the sub-synchronization sequence truncated in the time domain of the target synchronization sequence is a sequence which is a one-$X^{th}$ sequence segment of the target synchronization sequence, and the truncated sub-synchronization sequence is a ZC sequence, wherein a length of the ZC sequence is an integer multiple of X, and X is an integer greater than or equal to 2.

9. The method according to claim 8, wherein performing the synchronization detection on the basis of the target synchronization sequence comprises:
    performing a correlation processing on the target synchronization sequence with a preset synchronization sequence;
    determining a subcarrier spacing with which the base station transmits the target synchronization sequence, on the basis of the quantity of correlated peaks derived from the correlation processing; and
    performing the synchronization detection on the basis of the subcarrier spacing and the truncated sub-synchronization sequence.

10. The method according to claim 8, wherein performing the synchronization detection on the basis of the truncated sub-synchronization sequence comprises:
    calculating a $p^{th}$ power of the truncated sub-synchronization sequence to obtain a to-be-detected sequence, wherein p is an integer greater than or equal to 2; and
    performing the synchronization detection on the basis of the to-be-detected sequence.

11. A device for synchronization detection, comprising: a processor, a memory and a transceiver, wherein the processor is configured to read a program in the memory and perform the method according to claim 8;
    wherein the transceiver is configured to transmit and receive data, and the memory is configured to store data to be used by the processor when performing operations.

12. The device according to claim 11, wherein performing the synchronization detection on the basis of the target synchronization sequence comprises:
    performing a correlation processing on the target synchronization sequence with a preset synchronization sequence;
    determining a subcarrier spacing with which the base station transmits the target synchronization sequence, on the basis of the quantity of correlated peaks derived from the correlation processing; and
    performing the synchronization detection on the basis of the subcarrier spacing and the truncated sub-synchronization sequence.

13. The device according to claim 11, wherein performing the synchronization detection on the basis of the truncated sub-synchronization sequence comprises:
    calculating a $p^{th}$ power of the truncated sub-synchronization sequence to obtain a to-be-detected sequence, wherein p is an integer greater than or equal to 2; and
    performing the synchronization detection on the basis of the to-be-detected sequence.

14. A device for transmitting a synchronization sequence, comprising: a processor, a memory and a transceiver, wherein the processor is configured to read a program in the memory and perform the following process:
    setting a target synchronization sequence, wherein at least one segment of sequence truncated in a time domain or a frequency domain of the target synchronization sequence is a sub-synchronization sequence; and
    transmitting the target synchronization sequence to a user equipment via the transceiver,
    wherein the transceiver is configured to transmit and receive data, and the memory is configured to store data to be used by the processor when performing operations;
    wherein setting the target synchronization sequence comprises: obtaining a reference synchronization sequence; and rearranging, in accordance with a preset rule, a plurality of sequence points of the reference synchronization sequence, to obtain the target synchronization sequence; and wherein,
    in a case that the reference synchronization sequence is a Zadoff-Chu (ZC) sequence and a length of the ZC sequence is even, rearranging, in accordance with the preset rule, the plurality of sequence points of the reference synchronization sequence, to obtain the target synchronization sequence comprises: extracting the sequence points from the reference synchronization sequence at equal intervals and placing the extracted sequence points sequentially to obtain the target synchronization sequence; or
    in a case that the reference synchronization sequence is a ZC sequence, and a length of the ZC sequence is odd and equal to a square of N, rearranging, in accordance with the preset rule, the plurality of sequence points of the reference synchronization sequence, to obtain the target synchronization sequence comprises: extracting a target sequence point, starting from a $0^{th}$ sequence point of the reference synchronization sequence, from every N successive sequence points of the reference synchronization sequence; and placing the extracted target sequence points sequentially in preset positions of the reference synchronization sequence, to obtain the target synchronization sequence, wherein N is an integer greater than or equal to 3; or
    in a case that the reference synchronization sequence is a ZC sequence and a length of the ZC sequence is even, rearranging, in accordance with the preset rule, the plurality of sequence points of the reference synchronization sequence, to obtain the target synchronization sequence comprises: truncating even-numbered sequence points and odd-numbered sequence points of the reference synchronization sequence; placing the even-numbered sequence points of the reference synchronization sequence before the odd-numbered sequence points of the reference synchronization sequence to obtain a rearranged sequence, or placing the odd-numbered sequence points of the reference synchronization sequence before the even-numbered sequence points of the reference synchronization sequence to obtain the rearranged sequence; and mapping the rearranged sequence to subcarriers in the frequency domain respectively and performing an inverse Fourier transformation on the mapped rearranged sequence to obtain the target synchronization sequence.

15. The device according to claim 14, wherein extracting the sequence points from the reference synchronization sequence at equal intervals and placing the extracted sequence points sequentially to obtain the target synchronization sequence comprises:
    extracting even-numbered sequence points and odd-numbered sequence points from the reference synchronization sequence;

partitioning the even-numbered sequence points into a plurality of first short sequences, and partitioning the odd-numbered sequence points into a plurality of second short sequences, wherein the first short sequence comprises a plurality of successive even-numbered sequence points and the second short sequence comprises a plurality of successive odd-numbered sequence points; and arranging, in accordance with a preset order, the plurality of first short sequences and the plurality of second short sequences, to obtain the target synchronization sequence.

16. The device according to claim 15, wherein arranging, in accordance with the preset order, the plurality of first short sequences and the plurality of second short sequences, to obtain the target synchronization sequence comprises:

placing the first short sequences and the second short sequences alternately, to obtain the target synchronization sequence.

17. The device according to claim 15, wherein in a case that a result of dividing the length of the reference synchronization sequence by 4 is even, the plurality of first short sequences are ZC sequences; and in a case that the result of dividing the length of the reference synchronization sequence by 4 is odd, the plurality of second short sequences are ZC sequences.

18. The device according to claim 14, wherein the preset positions are those with sequence numbers starting from integer multiples of N.

19. The device according to claim 18, wherein in a case that the length of the ZC sequence is an integer multiple of X, the sub-synchronization sequence truncated in the time domain of the target synchronization sequence is a sequence which is a one-$X^{th}$ sequence segment of the target synchronization sequence, and the sub-synchronization sequence is a ZC sequence, wherein X is an integer greater than or equal to 2.

20. The device according to claim 14, wherein the sub-synchronization sequence truncated in the frequency domain of the target synchronization sequence is a sequence which is a first one-fourth sequence segment of the target synchronization sequence, a second one-fourth sequence segment of the target synchronization sequence, a third one-fourth sequence segment of the target synchronization sequence and/or a fourth one-fourth sequence segment of the target synchronization sequence, and the sub-synchronization sequence is a ZC sequence.

* * * * *